(12) United States Patent
Moroski et al.

(10) Patent No.: US 9,697,046 B2
(45) Date of Patent: Jul. 4, 2017

(54) MANAGING RESOURCE RESERVATIONS IN A HIGHLY PARALLEL APPLICATION

(71) Applicant: VMware, Inc., Palo Alto, CA (US)

(72) Inventors: Jeffrey Moroski, South Abington Township, PA (US); Praagyan Pokharel, Somerville, MA (US)

(73) Assignee: VMware, Inc., Palo Alto, CA (US)

( * ) Notice: Subject to any disclaimer, the term of this patent is extended or adjusted under 35 U.S.C. 154(b) by 0 days.

(21) Appl. No.: 14/745,101

(22) Filed: Jun. 19, 2015

(65) Prior Publication Data

US 2016/0371119 A1 Dec. 22, 2016

(51) Int. Cl.
*G06F 9/50* (2006.01)

(52) U.S. Cl.
CPC .......... *G06F 9/5005* (2013.01); *G06F 9/5016* (2013.01)

(58) Field of Classification Search
CPC .................................................. G06F 9/5005
See application file for complete search history.

(56) References Cited

U.S. PATENT DOCUMENTS

| | | | | |
|---|---|---|---|---|
| 8,209,695 | B1 * | 6/2012 | Pruyne | G06F 9/5077 709/226 |
| 8,584,129 | B1 * | 11/2013 | Czajkowski | G06F 9/5005 717/100 |
| 2007/0022425 | A1 * | 1/2007 | Jackson | G06F 9/5027 718/104 |
| 2007/0171921 | A1 * | 7/2007 | Wookey | G06F 3/1415 370/401 |
| 2008/0244576 | A1 * | 10/2008 | Kwon | G06F 9/5016 718/1 |
| 2012/0149464 | A1 * | 6/2012 | Bone | G06F 9/5044 463/30 |

OTHER PUBLICATIONS

Carlson, Emma, et al. "A distributed end-to-end reservation protocol for IEEE 802.11-based wireless mesh networks." IEEE Journal on Selected Areas in Communications 24.11 (2006): 2018-2027.*

* cited by examiner

*Primary Examiner* — Charlie Sun (57) ABSTRACT

A method for managing computing resource reservations comprises receiving a first reservation, at a reservation system, for a requested amount of computing resources for a virtual application from a total pool of available resources. The method further comprises adding the first reservation to a database of existing reservations if the requested amount of computing resources is available and associating the first reservation with a universal timestamp. The method also comprises verifying that the requested amount of computing resources is still available by: summing a total of all existing reservations in the database with a same target and reservation type as the first reservation and with a universal timestamp before the universal timestamp associated with the first reservation; and subtracting the sum total of those existing reservations from the total pool of available resources to produce a difference. The method then comprises comparing the difference to the requested amount of computing resources. If the requested amount of computing resources is less than the difference, the method provisions the requested resources for the virtual application. If the requested amount of computing resources is more than the difference, the method returns an error message.

20 Claims, 5 Drawing Sheets

FIGURE 1

| ReservationID | ReservationType | Reserved Time | Reservation Amount | TargetURI | SourceURI | Status |
|---|---|---|---|---|---|---|
| A | | | | | | |
| B | | | | | | |
| C | | | | | | |
| D | | | | | | |
| E | | | | | | |

| ReservationID | Reserved Sequence | Reserved Amount |
|---|---|---|
| A | 1 | 2 |
| B | 2 | 3 |

FIGURE 4A

| ReservationID | Reserved Sequence | Reserved Amount |
|---|---|---|
| A | 1 | 2 |
| B | 2 | 3 |
| C | 3 | 3 |
| D | 4 | 2 |

FIGURE 4B

| ReservationID | Reserved Sequence | Reserved Amount |
|---|---|---|
| A | 1 | 2 |
| B | 2 | 3 |
| D | 3 | 2 |
| C | 4 | 3 |

FIGURE 4C

| ReservationID | Reserved Sequence | Reserved Amount |
|---|---|---|
| A | 1 | 2 |
| B | 2 | 3 |

FIGURE 5A

| ReservationID | Reserved Sequence | Reserved Amount |
|---|---|---|
| A | 1 | 2 |
| B | 2 | 3 |
| C | 3 | 5 |
| D (rejected) | 4 | 4 |

FIGURE 5B

| ReservationID | Reserved Sequence | Reserved Amount |
|---|---|---|
| A | 1 | 2 |
| B | 2 | 3 |
| D | 3 | 4 |
| C (rejected) | 4 | 5 |

FIGURE 5C

MANAGING RESOURCE RESERVATIONS IN A HIGHLY PARALLEL APPLICATION

BACKGROUND

When virtual machines (VMs) are deployed in a virtual computing environment, each virtual machine needs a certain amount of resources (memory, input/output operations per second (IOPS), disk space, etc.) to perform its tasks. These resources are provisioned from a pool of available physical hardware resources. Until a VM is fully created, it does not use these physical resources. Instead, a VM provisioning process occurs and resources are reserved. At a later time the VM actually consumes the resources. Thus, there is a time delay between the resource reservation and the consumption of those resources.

In highly parallel applications, a large number of VMs and/or virtual applications may be concurrently created. Problems can occur when a VM requests resources and those resources are not available when the VM needs to use those resources because the resources have been overprovisioned.

One technique for provisioning resources is to perform multiple quota checks throughout the creation and deployment process of the VMs. Availability of resources can be checked multiple times during the deployment process. However, multiple checks increases overhead and in times of highly parallel deployment there are instances where available computing resources is not being accurately depicted. There exists a window of time where a VM requests resources but is not consuming those resources yet, and those resources should not be available to other applications.

SUMMARY

One or more embodiments provide techniques for managing resource reservations in a virtual computing environment. In an embodiment, a method for managing computing resource reservations comprises receiving a first reservation, at a reservation system, for a requested amount of computing resources for a virtual application from a total pool of available resources. The method further comprises adding the first reservation to a database of existing reservations if the requested amount of computing resources is available and associating the first reservation with a universal timestamp. The method also comprises verifying that the requested amount of computing resources is still available by: summing a total of all existing reservations in the database with a same target and reservation type as the first reservation and with a universal timestamp before the universal timestamp associated with the first reservation; and subtracting the sum total of those existing reservations from the total pool of available resources to produce a difference. The method then comprises comparing the difference to the requested amount of computing resources. If the requested amount of computing resources is less than the difference, the method provisions the requested resources for the virtual application. If the requested amount of computing resources is more than the difference, the method returns an error message.

Further embodiments include a non-transitory computer-readable storage medium comprising instructions that cause a computer system to carry out the above method.

DETAILED DESCRIPTION

Embodiments provide a method of provisioning VMs by introducing a reservation system for computing resources. A database stores information to uniquely identify a reservation. A database server timestamps reservations stored in the database to ensure precise ordering of the reservations. Reservations are uniquely identified and can be treated as idempotent. A callback mechanism allows the reservation system to retrieve an exact amount of resources available without having knowledge of external hardware resources.

Figure 1:
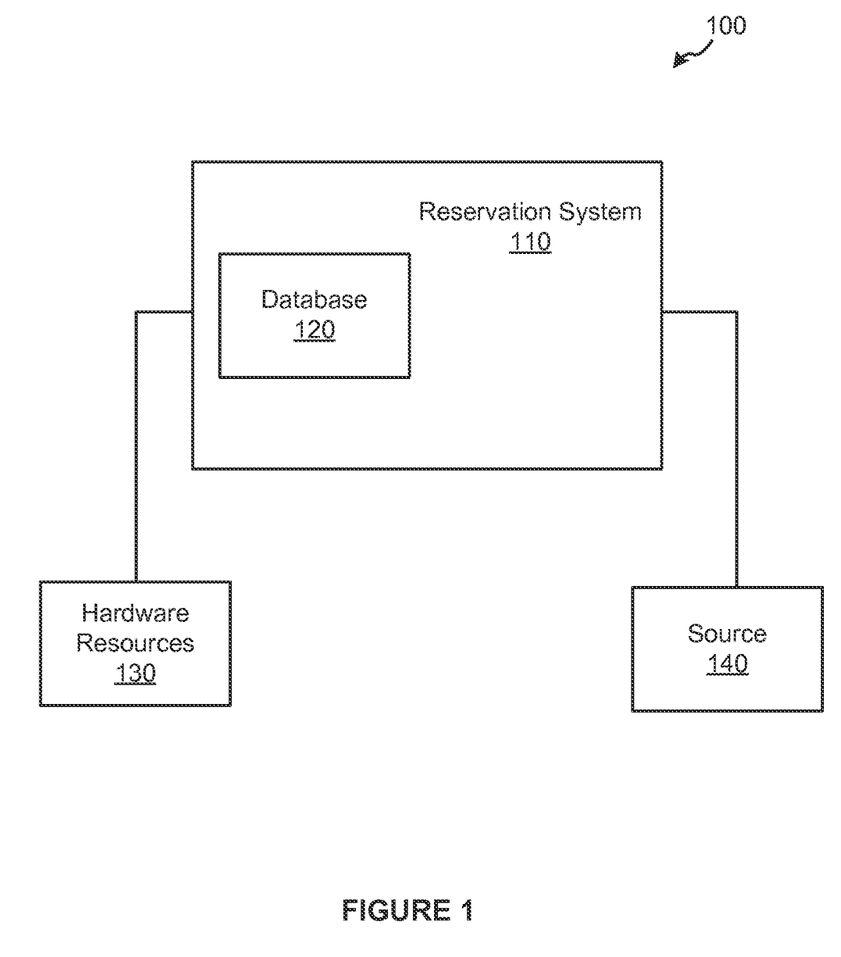
FIG. 1 is a computer system having a reservation system for reserving hardware resources.

FIG. 1 is an example computer system 100 in accordance with one embodiment. Computer system 100 comprises reservation system 110 and database 120. Reservation system 110 receives one or more requests for hardware resources 130 from sources 140. Database 120 comprises any suitable data structure for storing information regarding pending reservations received by reservation system 110. Hardware resources 130 comprise target resources where reservations will occur. These hardware resources 130 may include disk space, IOPS guarantee, compute resources, networking resources, or any other suitable hardware resource.

A reservation process utilizing computer system 100 operates as follows. A source 140 submits a request for reservation of specific hardware resources, such as storage space. Reservation system 110 receives the request and begins the reservation validation process to ensure that resources limits are not exceeded. This process ensures that parallel requests for reservation do not exceed the resource limit. Reservation system 110 ensures this by utilizing a two-transaction process.

The first step is to check that the reservation will fit on the target hardware resources. Logic in reservation system 110 retrieves the sum of all current reservations with the same target and reservation type as the request and subtracts that value from the total available. A caller to reservation system 110 provides reservation system 110 with a callback for calculating the total amount of resources available at hardware resources 130. Thus, reservation system 100 can get real-time resource information about hardware resources 130 without needing to know any details about hardware resources 130. If the reservation will not fit, an error message is returned to the requesting source 140. If the reservation will fit within the available hardware resources 130, an entry is added to the table (database 120). Each reservation comprises a unique identifier. A timestamp is also associated with each reservation in database 120. The timestamp is a microsecond precision timestamp generated in coordinated universal time (UTC) by the database server when a transaction is opened that makes one or more reservations. The UTC timestamp ensures precise ordering to the reservations and ensures fairness. By using a database timestamp, reservations across regions can be handled fairly in spite of potential time skews.

The second step in the reservation process is to check that the reservation still fits on the target hardware resources, taking the timestamp of the reservation into account. Logic for the second check retrieves the total of all current reservations with the same target and reservation type as the request, and a timestamp less than the request, an then proceeds with the subtraction and difference comparison described to determine if the reservation will fit within the available hardware resources. If the reservation will not fit, the reservation is deleted and an error message is returned to the requesting source 140. If the reservation still fits, a status of the reservation in database 120 is updated and a success message is returned to the requesting source 140. The requested hardware resources are then provisioned for the requesting source.

Figure 2:
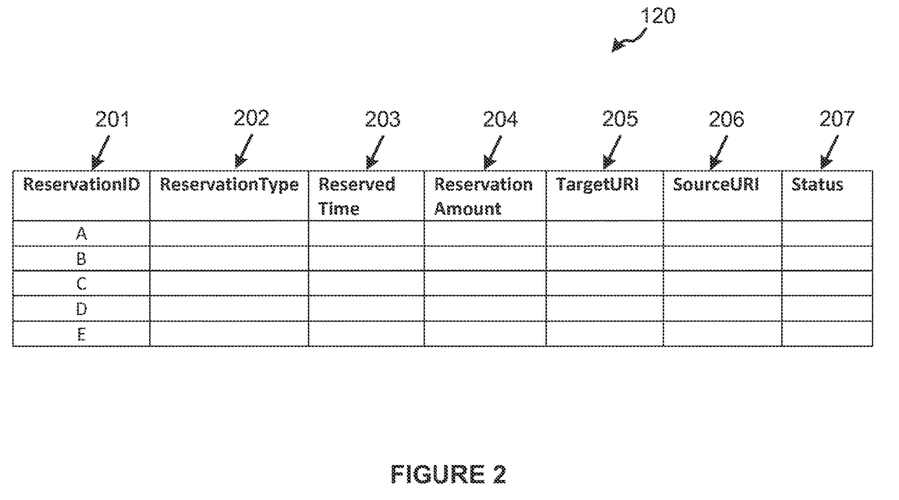
FIG. 2 illustrates a representation of a database for storing reservations.

FIG. 2 illustrates an example database 120 according to one embodiment. Database 120 is used as the queue for maintaining pending resource reservations. Database 120 could also be referred to as a database table, reservation queue table, or primary data structure. Any appropriate data structure may be used for database 120.

In this example embodiment of database 120, ReservationID 201 comprises a unique identifier associated with each reservation. Logic assigns a unique identifier to each reservation as it is received by reservation system 110. ReservationType 202 identifies an enumerated type of reservation to be made, such as disk space, IOPs guarantee, etc. ReservedTime 203 identifies the precise, time-based position of the reservation request in the queue. As noted above, ReservedTime 203 could be a microsecond UTC timestamp. The timestamp is generated by the database to ensure fairness.

ReservationAmount 204 identifies the total quantity of some resource that is reserved for this entity. The amount may be, for example, a total number of GB of storage space requested by the reservation. TargetURI 205 identifies the resource where the reservation will occur, which will be interpreted by the appropriate fabric. SourceURI 206 identifies the resource or object requesting the reservation. Status 207 is a field indicating the current state of the reservation request, such as whether the reservation has been committed or completed. The status 207 can assist in the case of a failure between the first and second steps of the reservation process described above, by allowing the commitment to be retried without the reservation losing its place in line.

Source and Target are defined as URI (uniform resource identifier) strings. These URIs can be used to define sources and targets and can be transparent to the reservation system 110. Reservation system 110 does not need to know what they refer to. A SourceURI provided to the reservation system 110 can contain enough information to determine the caller of the system, along with any identifying information necessary to convert the SourceURI back into an entity that is recognized by the system. This allows consumers of the reservation system to identify reservations that they have created, and allow actions to be taken on those reservations, such as validity checking or failure recovery. For example, in the result of failure, the entity requesting a reservation for resources can retrieve information from the database 120 and see if any reservation has erred as a result of a failure. If it did, those reservations can be retrieved and the source can be examined. Information in the SourceURI can be used to see if the reservation is still needed or not by examining the details of the source requester's systems and comparing that to the information in the SourceURI.

Database 120 contains all the necessary information to perform reservations. Secondary tables (not illustrated) may be utilized to provide additional information to users of the reservation system. Additional information can include, for example, a fine-grained breakdown of reservations by disk, information for reservation sources, etc.

Figure 3:
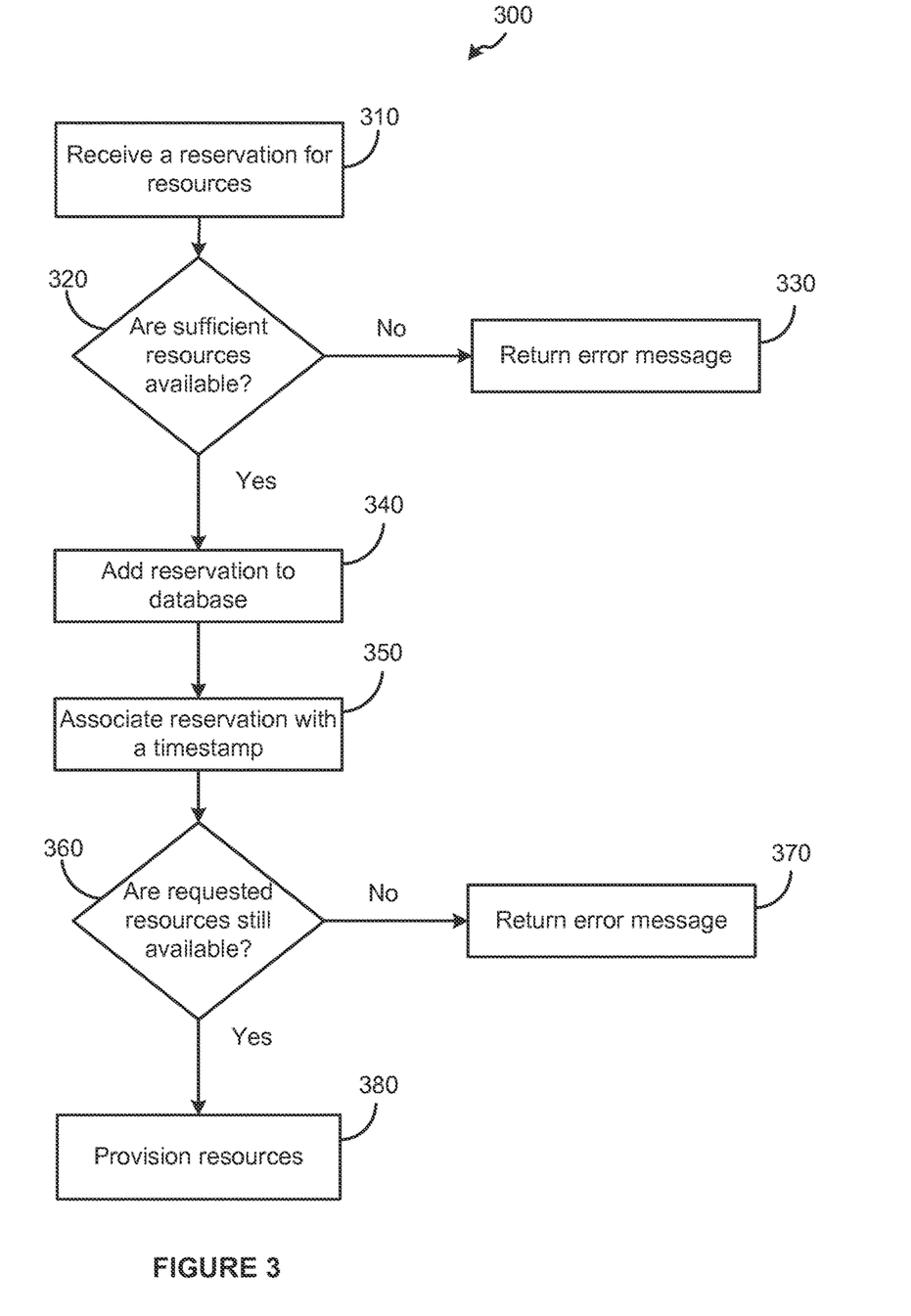
FIG. 3 is a flow diagram that illustrates a method of managing resource reservations.

FIG. 3 is a flow diagram that illustrates a method 300 of managing resource reservations. First, at step 310, reservation system 110 receives a request for a reservation from a source 140, requesting a specific amount of computing resources for a virtual application from a total pool of available resources. At step 320, reservation system 110 determines if sufficient resources are available from the pool of computing resources. Reservation system 100 can utilize the process described above to determine if sufficient resources are available. If sufficient resources are not available, an error message is returned to the requesting source at step 330. If sufficient resources are available, the reservation is added to the database of existing reservations at step 340.

At step 350, the requested reservation is associated with a timestamp. The timestamp for each reservation is generated by the database to ensure consistency and fairness among the incoming reservations. At step 360, a second check of resources is performed by the reservation system, as described above. In this step, logic in reservation system 110 sums the total of all current reservations with the same target and reservation type as the request, and with a timestamp before the request, and subtracts that value from the total resources available. If there are not sufficient resources available to fulfill the request, the method proceeds to step 370 where an error message is returned. If sufficient resources are available, the method proceeds to step 380, where the resources are provisioned. A success message can also be returned to the requesting entity, and a status of the request in database 120 can be updated.

Figure 4A:
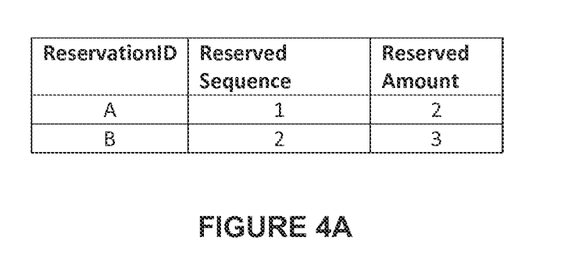
FIGS. 4A, 4B, and 4C illustrate reservation tables according to one example.
Figure 4B:
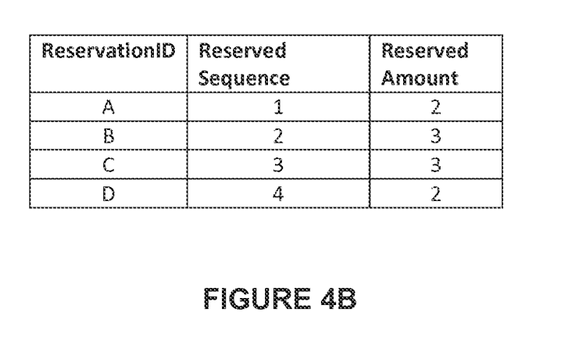
Figure 4C:
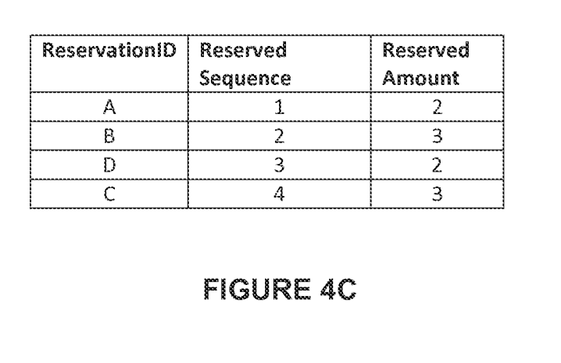

FIGS. 4A, 4B, and 4C illustrate example reservation tables according to one example embodiment. The reservation tables in this example are simplified; other columns and rows may be used in other embodiments, such as the columns illustrated in FIG. 2.

FIG. 4A illustrates an initial state of a reservation table before a new request for a reservation is received. Reservation IDs A and B are stored in the table, along with their sequence and reservation amount. Reservation A is the first in sequence, and Reservation B is second. In this example, the Reservation Amount for A is 2 and the Reservation Amount for B is 3. Assume that the resource limit is 10. Since 5 resources are reserved (A+B, or 2+3), there are 5 free resources remaining (10–5).

FIGS. 4B and 4C illustrate possible queue orders for two simultaneous requests, where enough resources exist for both reservations to be admitted. Assume that requests C and D arrive at reservation system 110 at the same time. For request C, the Reservation Amount is 3, and the Reserved Sequence is either 3 or 4. For request D, the Reservation Amount is 2, and the Reserved Sequence is also either 3 or 4. For request C, the sum of all earlier reservations is either 5 or 7 (either A+B or A+B+D). Since the sum of C (3) and either 5 or 7 is less than or equal to the resource limit of 10, request C is admitted for either sequence.

For request D, the sum of all earlier reservations is either 5 or 8 (either A+B or A+B+C). Since the sum of D (2) and either 5 or 8 is less than or equal to the resource limit of 10, request D is also admitted for either sequence. FIGS. 4B and 4C show the reservation tables with both possible queue orders, A-B-C-D or A-B-D-C, respectively.

Figure 5A:
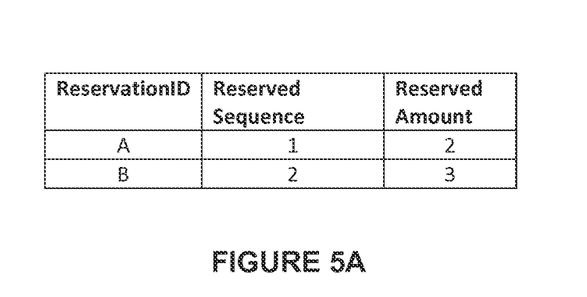
FIGS. 5A, 5B, and 5C illustrate reservation tables according to another example.
Figure 5B:
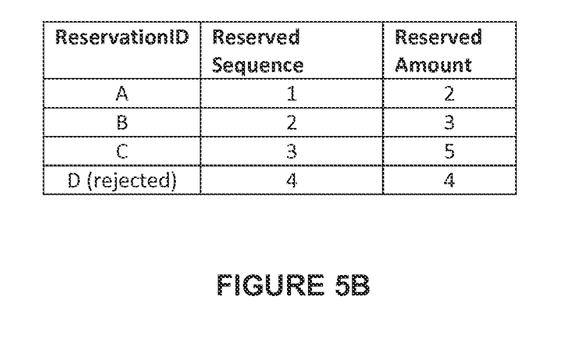
Figure 5C:
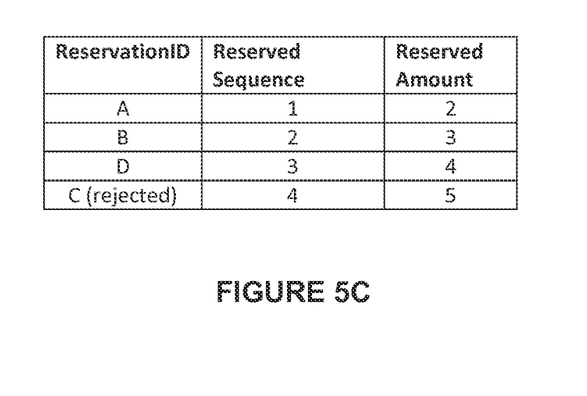

FIGS. 5A, 5B, and 5C illustrate example reservation tables according to another example embodiment. The reservation tables in this example are simplified; other columns and rows may be used in other embodiments, such as the columns illustrated in FIG. 2.

FIG. 5A illustrates an initial state of a reservation table before a new request for a reservation is received. Reservation IDs A and B are stored in the table, along with their sequence and reservation amount. Reservation A is the first in sequence, and Reservation B is second. In this example, the Reservation Amount for A is 2 and the Reservation Amount for B is 3. Assume that the resource limit is 10. Since 5 resources are reserved (A+B, or 2+3), there are 5 free resources remaining (10−5).

FIGS. 5B and 5C illustrate possible queue orders for two simultaneous requests, where enough resources exist for only one reservation, so one reservation will be admitted and one will be rejected. Assume that requests C and D arrive at reservation system 110 at the same time. For request C, the Reservation Amount is 5, and the Reserved Sequence is either 3 or 4. For request D, the Reservation Amount is 4, and the Reserved Sequence is also either 3 or 4. For request C, the sum of all earlier reservations is either 5 or 9 (either A+B or A+B+D). If C is placed in Reserved Sequence 3, the sum of the earlier reservation is 5 (A+B), and C can be admitted with a Reservation Amount of 5. If C is placed in Reserved Sequence 4, the sum of earlier reservations is 9 (A+B+D), and C is rejected, because 9+5 will exceed the total amount of available resources of 10. FIG. 5B illustrates C admitted as Reserved Sequence 3, and FIG. 5C illustrates C rejected as Reserved Sequence 4.

If D is placed in Reserved Sequence 3, the sum of the earlier reservations is 5 (A+B), and D can be admitted with a Reservation Amount of 4. If D is placed in Reserved Sequence 4, the sum of earlier reservations is 10 (A+B+C), and D is rejected, because 10+4 will exceed the total amount of resources of 10. FIG. 5B illustrates D rejected as Reserved Sequence 4, and FIG. 5C illustrates D admitted as Reserved Sequence 3.

One advantage of the above described embodiments is that pending reservations are utilized to determine resource availability. This helps to ensure that resources are not selected for provisioning multiple times, resulting in failed provisions. Another advantage is the use of a centralized timestamp generated by the database that allows for fairness with respect to time skews. Further, reservations can be retried in event of failure without the reservation losing its place in the queue.

Certain embodiments as described above involve a hardware abstraction layer on top of a host computer. The hardware abstraction layer allows multiple contexts to share the hardware resource. In one embodiment, these contexts are isolated from each other, each having at least a user application running therein. The hardware abstraction layer thus provides benefits of resource isolation and allocation among the contexts. In the foregoing embodiments, virtual machines are used as an example for the contexts and hypervisors as an example for the hardware abstraction layer. As described above, each virtual machine includes a guest operating system in which at least one application runs. These embodiments may also apply to other examples of contexts, such as containers not including a guest operating system, referred to herein as "OS-less containers" (see, e.g., www.docker.com). OS-less containers implement operating system-level virtualization, wherein an abstraction layer is provided on top of the kernel of an operating system on a host computer. The abstraction layer supports multiple OS-less containers each including an application and its dependencies. Each OS-less container runs as an isolated process in user space on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

In addition, while described virtualization methods have generally assumed that virtual machines present interfaces consistent with a particular hardware system, persons of ordinary skill in the art will recognize that the methods described may be used in conjunction with virtualizations that do not correspond directly to any particular hardware system. Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

We claim:

1. A method for managing computing resource reservations, comprising:
   receiving a first reservation, at a reservation system, for a requested amount of computing resources for a virtual application from a total pool of available resources;
   adding the first reservation to a database of existing reservations if the requested amount of computing resources is available;
   associating the first reservation with a timestamp generated in coordinated universal time (UTC) by a server to ensure fairness with respect to time skews;
   verifying that the requested amount of computing resources is still available by:
      summing a total of all existing reservations in the database with a same target and reservation type as the first reservation and with a timestamp generated in UTC before the timestamp associated with the first reservation;
      subtracting the summed total of those existing reservations from the total pool of available resources to produce a difference; and
      comparing the difference to the requested amount of computing resources;
   provisioning the requested resources for the virtual application, if the requested amount of computing resources is less than the difference; and
   returning an error message, if the requested amount of computing resources is more than the difference.

2. The method of claim 1, wherein the method further comprises, if the requested amount of computing resources is not available, returning a second error message.

3. The method of claim 1, wherein a total amount of computing resources available is provided to the reservation system by an external manager of computing resources.

4. The method of claim 1, wherein the database includes a status field for each reservation in the database, indicating whether the reservation has been completed.

5. The method of claim 1, wherein the timestamp is generated by the database.

6. The method of claim 1, further comprising:
   determining that the requested amount of computing resources is available before adding the first reservation to the database by:
   summing a second total of the all existing reservations in the database with the same target and reservation type as the first reservation;
   subtracting the summed total of those existing reservations from the total pool of available resources to produce a second difference; and
   comparing the second difference to the requested amount of computing resources.

7. The method of claim 1, wherein the requested computing resources comprise memory resources.

8. A non-transitory computer-readable storage medium containing a program which, when executed by one or more processors, performs operations for sharing folders and files across computing devices, the operations comprising:
   receiving a first reservation, at a reservation system, for a requested amount of computing resources for a virtual application from a total pool of available resources;
   adding the first reservation to a database of existing reservations if the requested amount of computing resources is available;
   associating the first reservation with a timestamp generated in coordinated universal time (UTC) by a server to ensure fairness with respect to time skews;
   verifying that the requested amount of computing resources is still available by:
      summing a total of all existing reservations in the database with a same target and reservation type as the first reservation and with a timestamp generated in UTC before the timestamp associated with the first reservation;
      subtracting the summed total of those existing reservations from the total pool of available resources to produce a difference; and
      comparing the difference to the requested amount of computing resources;
   provisioning the requested resources for the virtual application, if the requested amount of computing resources is less than the difference; and
   returning an error message, if the requested amount of computing resources is more than the difference.

9. The non-transitory computer-readable storage medium of claim 8, wherein the operations further comprise, if the requested amount of computing resources is not available, returning a second error message.

10. The non-transitory computer-readable storage medium of claim 8, wherein a total amount of computing resources available is provided to the reservation system by an external manager of computing resources.

11. The non-transitory computer-readable storage medium of claim 8, wherein the database includes a status field for each reservation in the database, indicating whether the reservation has been completed.

12. The non-transitory computer-readable storage medium of claim 8, wherein the timestamp is generated by the database.

13. The non-transitory computer-readable storage medium of claim 8, the operations further comprising:
   determining that the requested amount of computing resources is available before adding the first reservation to the database by:
   summing a second total of the all existing reservations in the database with the same target and reservation type as the first reservation;
   subtracting the summed total of those existing reservations from the total pool of available resources to produce a second difference; and
   comparing the second difference to the requested amount of computing resources.

14. The non-transitory computer-readable storage medium of claim 8, wherein the requested computing resources comprise memory resources.

15. A system, comprising:
   a processor; and
   a memory, wherein the memory includes a program executable in the processor to perform operations for sharing folders and files across computing devices, the operations comprising:
   receiving a first reservation, at a reservation system, for a requested amount of computing resources for a virtual application from a total pool of available resources;
   adding the first reservation to a database of existing reservations if the requested amount of computing resources is available;
   associating the first reservation with a timestamp generated in coordinated universal time (UTC) by a server to ensure fairness with respect to time skews;
   verifying that the requested amount of computing resources is still available by:
      summing a total of all existing reservations in the database with a same target and reservation type as the first reservation and with a timestamp generated in UTC before the timestamp associated with the first reservation;
      subtracting the summed total of those existing reservations from the total pool of available resources to produce a difference; and
      comparing the difference to the requested amount of computing resources;
   provisioning the requested resources for the virtual application, if the requested amount of computing resources is less than the difference; and
   returning an error message, if the requested amount of computing resources is more than the difference.

16. The system of claim 15, wherein the operations further comprise, if the requested amount of computing resources is not available, returning a second error message.

17. The system of claim 15, wherein a total amount of computing resources available is provided to the reservation system by an external manager of computing resources.

18. The system of claim 15, wherein the database includes a status field for each reservation in the database, indicating whether the reservation has been completed.

19. The system of claim 15, wherein the timestamp is generated by the database.

20. The system of claim 15, the operations further comprising:
   determining that the requested amount of computing resources is available before adding the first reservation to the database by:
   summing a second total of the all existing reservations in the database with the same target and reservation type as the first reservation;
   subtracting the summed total of those existing reservations from the total pool of available resources to produce a second difference; and
   comparing the second difference to the requested amount of computing resources.

\* \* \* \* \*